United States Patent
Kataoka et al.

(10) Patent No.: US 8,138,644 B2
(45) Date of Patent: Mar. 20, 2012

(54) MOTOR (75) Inventors: Nakaba Kataoka, Kyoto (JP);
Motofumi Otsuji, Kyoto (JP); Yoshiaki Yamashita, Kyoto (JP)

(73) Assignee: Nidec Corporation, Kyoto (JP)

( * ) Notice: Subject to any disclaimer, the term of this patent is extended or adjusted under 35 U.S.C. 154(b) by 295 days.

(21) Appl. No.: 12/671,213

(22) PCT Filed: Jul. 28, 2008

(86) PCT No.: PCT/JP2008/064258
§ 371 (c)(1),
(2), (4) Date: Jan. 29, 2010

(87) PCT Pub. No.: WO2009/017257
PCT Pub. Date: Feb. 5, 2009

(65) Prior Publication Data
US 2010/0201213 A1   Aug. 12, 2010

(30) Foreign Application Priority Data

Jul. 31, 2007   (JP) ................................. 2007-199288

(51) Int. Cl.
*H02K 11/00* (2006.01)
(52) U.S. Cl. .......................................... 310/71; 310/260
(58) Field of Classification Search .................... 310/71, 310/260
See application file for complete search history.

(56) References Cited

U.S. PATENT DOCUMENTS

| 4,689,023 | A | 8/1987 | Strong, III et al. | |
|---|---|---|---|---|
| 7,453,175 | B2 * | 11/2008 | Nakanishi et al. | 310/68 B |
| 7,595,572 | B2 * | 9/2009 | Haga et al. | 310/71 |
| 7,626,294 | B2 * | 12/2009 | Ohta et al. | 310/71 |
| 7,663,287 | B2 * | 2/2010 | Haga et al. | 310/260 |
| 7,723,878 | B2 * | 5/2010 | Yagai et al. | 310/71 |
| 2006/0068617 | A1 | 3/2006 | Migita et al. | |
| 2006/0138883 | A1 * | 6/2006 | Yagai et al. | 310/71 |
| 2007/0278875 | A1 * | 12/2007 | Haga et al. | 310/71 |
| 2007/0278876 | A1 * | 12/2007 | Haga et al. | 310/71 |
| 2008/0017438 | A1 * | 1/2008 | Kanda et al. | 180/443 |
| 2009/0256439 | A1 * | 10/2009 | Inoue et al. | 310/71 |
| 2010/0187924 | A1 * | 7/2010 | Yagai et al. | 310/71 |
| 2010/0201213 | A1 * | 8/2010 | Kataoka et al. | 310/71 |
| 2011/0068647 | A1 * | 3/2011 | Sakaue et al. | 310/71 |

FOREIGN PATENT DOCUMENTS

| FR | 2 781 316 A3 | 1/2000 |
|---|---|---|
| FR | 2 823 615 A1 | 10/2002 |
| JP | 61-227648 A | 10/1986 |
| JP | 10-4645 A | 1/1998 |
| JP | 2000-134844 A | 5/2000 |
| JP | 2001-268843 A | 9/2001 |
| JP | 2003-284279 A | 10/2003 |

* cited by examiner

OTHER PUBLICATIONS

Official Communication issued in International Patent Application No. PCT/JP2008/064258, mailed on Apr. 23, 2009.

*Primary Examiner* — Thanh Lam
(74) *Attorney, Agent, or Firm* — Keating & Bennett, LLP (57) ABSTRACT A motor includes a plurality of bus wires of a common phase which are put together before being guided in a common passage to minimize the space arranged to guide the bus wires. Also, the bus wires of a common phase are easily insulated from those of different phases, and an axial height of the motor is reduced. Further, a radial width necessary to guide the bus wires is reduced, and an axial height of the motor including a sensor portion which detects a rotary position of the motor is reduced. Also, the bus wires are easily extended from the armature, and an amount of work required to connect the bus wires and the terminals is reduced. Furthermore, the connection terminal portion does not interfere with the bus wires when they are being guided.

13 Claims, 11 Drawing Sheets

MOTOR

BACKGROUND OF THE INVENTION

1. Field of the Invention

The present invention relates to a motor, and more particularly to a technology used to connect a bus wire of an armature of a motor to an external power source.

2. Description of the Related Art

A motor typically includes an armature having a plurality of coils arranged in an annular shape via which a multiple phase alternating current is supplied. There are many methods used to prevent coils of different phases from making contact with one another inside the armature. For example, Japanese Laid-Open Patent Publication (S) 61-227648 discloses an armature which includes two groove portions having an annular shape arranged at an upper surface and a lower surface of an insulating layer which cover a yoke portion of an annular shape, wherein lead wires of each phase are accommodated in different groove portions so as to avoid the contact among the lead wires.

In an armature disclosed in Japanese Laid-Open Patent Publication (H) 10-4645, an upper cover and a lower cover which cover a stator core of an annular shape include an indent portion having an annular shape in which lead wires of each phase are aligned so as to insulate them.

According to Japanese Laid-Open Patent Publication 2000-134844, an armature includes a plurality of wire containing portions having a groove shape for accommodating therein lead wires of each phase and arranged at an outer side surface of an insulator to cover a core in a direction parallel with the central axis of the core.

On the other hand, in a conventional armature that does not rely on lead wires, a busbar is used to connect a bus wire of the armature and an external power source. For example, in a busbar as disclosed in a Japanese Laid-Open Patent Publication 2003-284279, a plurality of laminated ring bodies are each insulated from one another, wherein each ring body includes an external connection terminal at an outer side thereof and a coil connection terminal at an inner side thereof.

In recent years, the number of coils used in a motor has increased in order to improve the performance of the motor while the dimensions of the motor are expected to be reduced. Also, a position sensor used in a motor to detect a rotation of the motor is arranged around the armature which further complicates the wiring of the lead wires forming the coils while a space used for the wiring is minimized. Therefore, according to a method in which a busbar is used to connect the bus wire from the armature to an external power source, it is difficult to reduce the dimensions of the motor while manufacturing efficiency and accuracy are compromised.

SUMMARY OF THE INVENTION

In view of the aforementioned problems, preferred embodiments of the present invention provide an efficient connection between the external power source and the bus wire while minimizing the space required for the connection and minimizing the dimensions of the motor.

According to a first preferred embodiment of the present invention, a motor includes a stator portion including an armature having a substantially cylindrical shape, a rotor portion arranged inward of the armature and including a field magnet arranged to generate torque with the armature centered about a central axis, a bearing mechanism arranged to support the rotor portion coaxially or substantially coaxially with the central axis with respect to the stator portion in a rotatable manner, and an annular terminal block having a substantially annular shape arranged at one axial end of the armature, arranged to guide a bus wire extending from the armature, and to connect the bus wire to an external power source. The annular terminal block preferably includes a bus wire guiding portion having a substantially annular shape arranged along the armature, and including a guiding configuration in which a plurality of bus wires of a common phase are guided via a common passage arranged in a substantially arc shape, and a connection terminal portion arranged to connect the plurality of bus wires of a common phase extending from the bus wire guiding portion with the external power source.

According to a second preferred embodiment of the present invention, the guiding configuration preferably includes a groove which is arranged to guide the plurality of bus wires of a common phase.

According to a third preferred embodiment of the present invention, the guiding configuration preferably includes the same number of passages as the number of phases, and bus wires are guided in a corresponding passage in accordance with the phase in a substantially arc shape.

According to a fourth preferred embodiment of the present invention, the guiding configuration preferably includes a plurality of passages arranged in a radial direction.

According to a fifth preferred embodiment of the present invention, a plurality of coils are preferably connected via a star connection at the armature, and a substantially annular shaped conductive member which functions as a neutral point is arranged radially outward of the plurality of passages and on top of a core back connecting a plurality of teeth of the armature.

According to a sixth preferred embodiment of the present invention, the bus wires of a common phase are preferably guided in a groove arranged at an opposite side with respect to the armature of the bus wire guiding portion.

According to a seventh preferred embodiment of the present invention, the bus wires of a common phase are preferably laminated in the groove in a direction parallel or substantially parallel with the central axis.

According to an eighth preferred embodiment of the present invention, the motor preferably further includes a sensor portion arranged to detect a rotary position of the rotor portion, the bus wire guiding portion includes a non-layered portion at which only one bus wire is guided, and at least a portion of the sensor portion is arranged above the non-layered portion.

According to a ninth preferred embodiment of the present invention, the groove preferably includes a hole via which the bus wire is guided from the armature, and a diameter of the hole is preferably greater than a width of the groove.

According to a tenth preferred embodiment of the present invention, at least two of the plurality of bus wires of a common phase are preferably put together and connected to a terminal of the connection terminal portion.

According to an eleventh preferred embodiment of the present invention, a bus wire of the plurality of bus wires of a common phase preferably extends from below the connection terminal portion and is put together with any one of the plurality of bus wires of a common phase to be connected to one of the terminals.

According to a twelfth preferred embodiment of the present invention, the bus wire guiding portion and the connection terminal portion are preferably detachably connected to one another.

According to a thirteenth preferred embodiment of the present invention, the motor is preferably operable for use in assisting an operator of a vehicle.

According to various preferred embodiments of the present invention, a plurality of bus wires of a common phase are put together before being guided in a common passage to minimize the space required to guide the bus wires. Also according to various preferred embodiments of present invention, the bus wires of a common phase are arranged to be easily insulated from those of different phases. Also according to various preferred embodiments of the present invention, an axial height of the motor is reduced. Also according to various preferred embodiments of the present invention, a radial width necessary to guide the bus wires is reduced.

According to various preferred embodiments of the present invention, an axial height of the motor including a sensor portion which detects a rotary position of the motor is reduced. Also according to various preferred embodiments of present invention, the bus wires are easily extended from the armature. Also according to various preferred embodiments of present invention, an amount of processing required to connect the bus wires and the terminals is reduced. Also according to various preferred embodiments of present invention, the connection terminal portion does not interfere with the bus wires when they are being guided.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
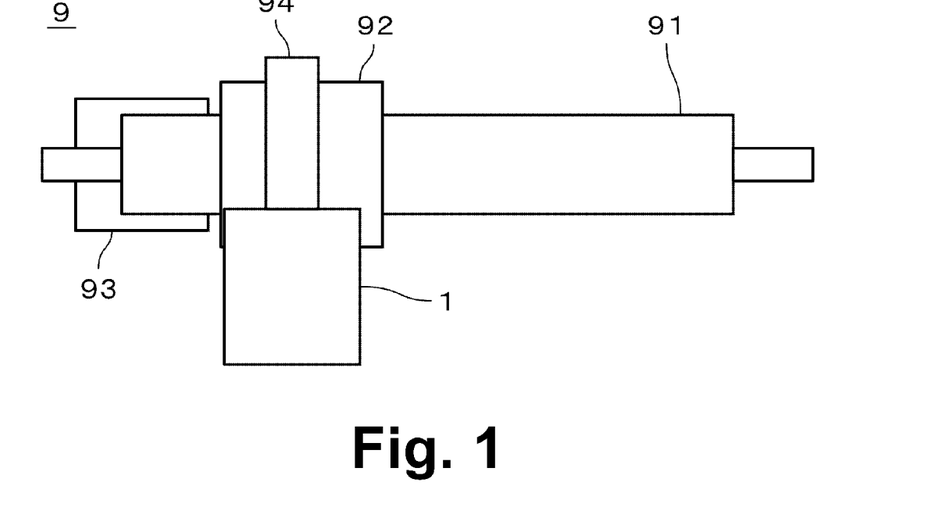
FIG. 1 is a schematic drawing showing a power steering device including a motor according to a first preferred embodiment of the present invention.

FIG. 1 is a schematic drawing showing a power steering device 9 including a motor according to a first preferred embodiment of the present invention. The power steering device 9 is typically used in a vehicle such as a passenger vehicle or the like to assist an operator of the vehicle in steering the vehicle, for example. The power steering device 9 preferably includes a shaft portion 91 which is connected to a steering wheel or a steering mechanism, a torque sensor 92 which detects a torque applied to the steering wheel, a control unit 93 (e.g., ECU or the like) which calculates a force necessary to assist the operator based on an output from the torque sensor 92, a motor 1 which generates a rotary force based on an output from the control unit 93, and a decelerating mechanism 94 which conducts the rotary force of the motor 1 to the steering mechanism.

In a motor vehicle having the power steering device 9, it becomes possible for the motor 1 of the power steering device 9 which is activated by a force applied to the steering wheel by the operator and assists the steering to not rely directly on an engine output and therefore allow the operator to steer the steering wheel using a relatively small force.

Figure 2:
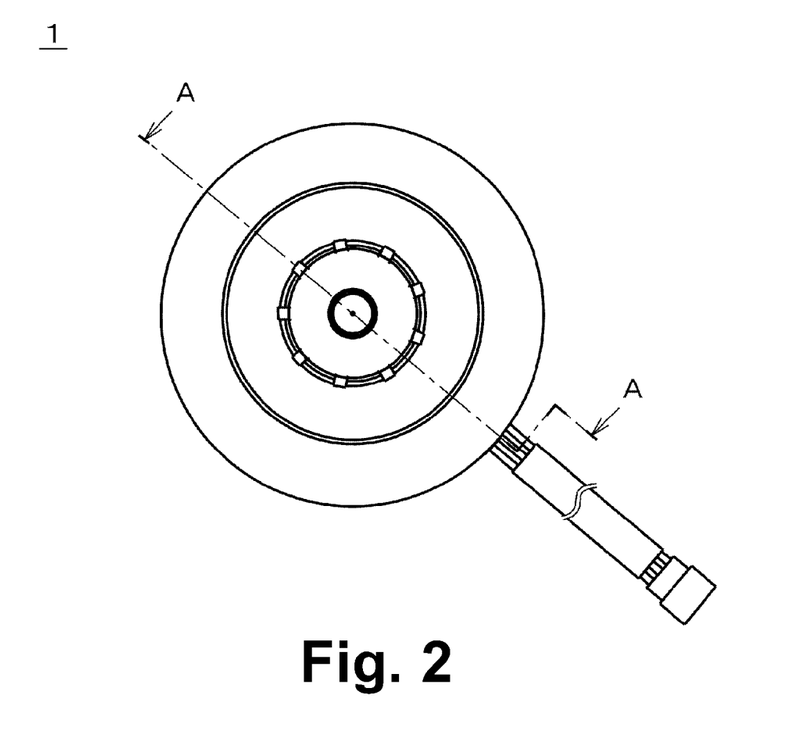
FIG. 2 is a schematic plan view of the motor.
Figure 3:
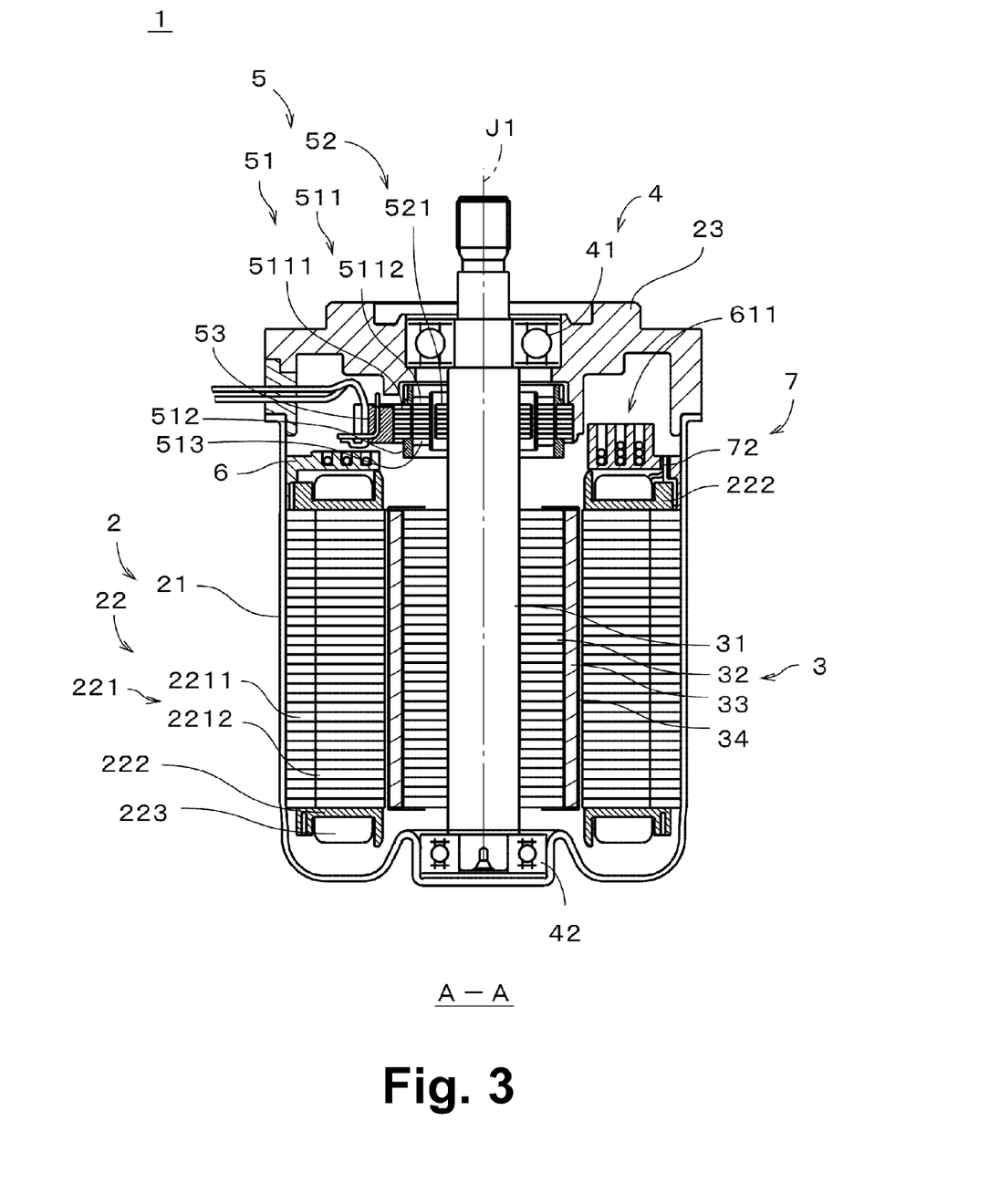
FIG. 3 is a schematic cross sectional view of the motor.

FIG. 2 is a schematic plan view of the motor 1. FIG. 3 is a schematic cross sectional view of the motor 1 taken along a line A-A shown in FIG. 2. The motor 1 is preferably a three phase alternating current motor of an inner rotor type which preferably includes a motor stator portion 2 which is a fixed assembly, a motor rotor portion 3 which is a rotatable assembly, a bearing mechanism 4 which supports the motor rotor portion 3 with respect to the motor stator portion 2 centered about the central axis J1 in a rotatable manner, a resolver 5 which is a sensor portion arranged to detect a rotary position of the motor 1, and an annular terminal block 6 preferably having an annular shape which is arranged at an upper area of an armature 22 (described below) and connects the armature 22 and an external power source (not shown). In the description hereafter, although, for convenience of description, a side of the motor 1 where the resolver 5 is arranged will be referred to as an upper side; and a side of the motor 1 where the motor stator portion 2 and the motor rotor portion 3 are arranged will be referred to as a lower side with respect to the central axis J1, the directions do not necessarily correspond with the gravitational direction.

Figure 4:
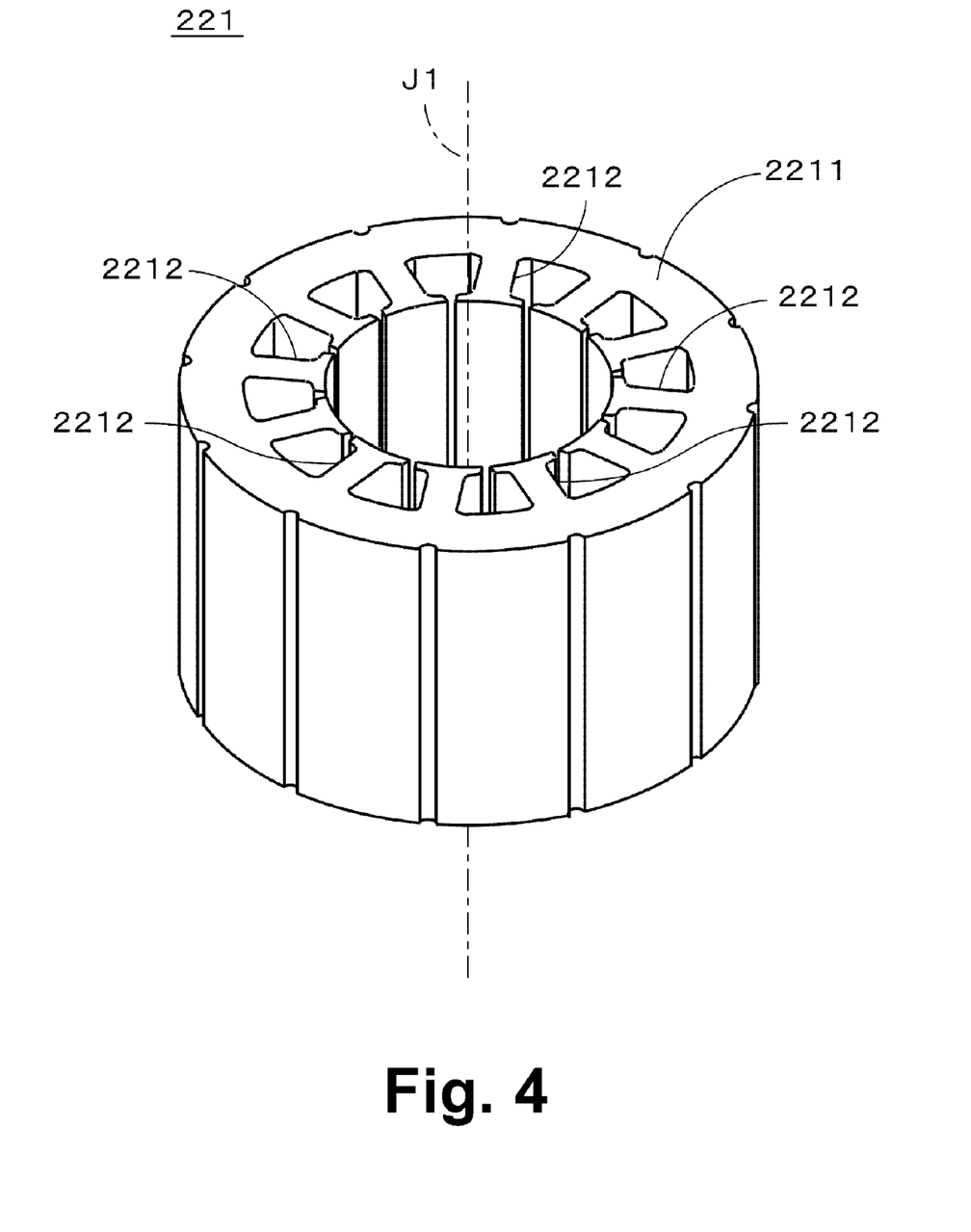
FIG. 4 is a schematic perspective view of a stator core of the motor.

The motor stator portion 2 preferably includes a housing 21 having a substantially cylindrical shape with a bottom portion, the armature 22 arranged at an inner circumferential surface of the housing 21, and a bracket 23 arranged axially above the annular terminal block 6. The armature 22 preferably includes a stator core 221 of laminated thin plates of silicon steel, and an insulator 222 which is made of an insulating member and covers the surface of the stator core 221. However, any other desirable type of stator armature other than a laminated stator armature could be used. As shown in FIG. 4, the stator core 221 preferably includes twelve teeth 2212, for example, each extending toward the central axis J1, and a core back 2211 having a substantially annular shape connecting the teeth 2212. As shown in FIG. 3, a wire is wound around each tooth 2212 via the insulator 222 in a concentrated winding manner to define twelve coils 223. Note that the motor 1 and the armature 22 share the same central axis J1.

The motor rotor portion 3 preferably includes a shaft 31 concentric with the central axis J1, a yoke 32 having a substantially cylindrical shape affixed around the shaft 31, a field magnet 33 affixed via an adhesive, for example, at an outer circumferential surface of the yoke 32, and a cover member 34 arranged to cover an outer side of the field magnet 33. The yoke 32 is preferably defined by laminating a plurality of thin silicon steel plates, but any other desirable type of rotor yoke could be used. The field magnet 33 is preferably arranged at an inner side of the armature 22. A torque centered about the central axis J1 is generated between the armature 22 and the field magnet 33.

The bearing mechanism 4 preferably includes an upper ball bearing 41 arranged at an inner circumferential surface of the bracket 23, and a lower ball bearing 42 arranged at a substantially central area of the bottom portion of the housing 21. The shaft 31 of the motor rotor portion 3 preferably protrudes upwardly via an opening of the bracket 23, and is supported in a rotatable manner by the upper ball bearing 41 and the lower ball bearing 42.

The resolver 5 is preferably a variable reluctance type and includes a resolver stator portion 51 having a substantially annular shape arranged inside the annular terminal block 6, and a resolver rotor portion 52 affixed to the shaft 31 of the motor rotor portion 3 inside the resolver stator portion 51, wherein the resolver stator portion 51 is connected to the control unit 93 (see FIG. 1) via an external wiring which is connected to a connector portion 53.

The resolver rotor portion 52 preferably includes a rotor core 521 defined by laminating magnetic steel plates having a substantially annular shape. The resolver stator portion 51 preferably includes a stator core 511 defined by laminating thin magnetic steel plates. It should be noted that any other desirable type of rotor core 521 and stator core 511 could be used. The stator core 511 preferably includes a core back 5111 having a substantially annular shape and a plurality of teeth 5112 each extending inwardly from the core back 5111. A plurality of coils 513 are preferably defined (see FIG. 12) by winding a wire around each tooth 5112 via an insulator 512 of insulating material. The coils 513 preferably include one phase of an exciting coil and two phases of output coils, wherein, while the motor 1 is activated, a magnetic flux is generated by the exciting coil and, as the resolver rotor portion 52 attached to the shaft 31 rotates, a rotary position of the motor rotor portion 3 with respect to the motor stator portion 2 will be detected based on an output from the output coils.

Figure 5:
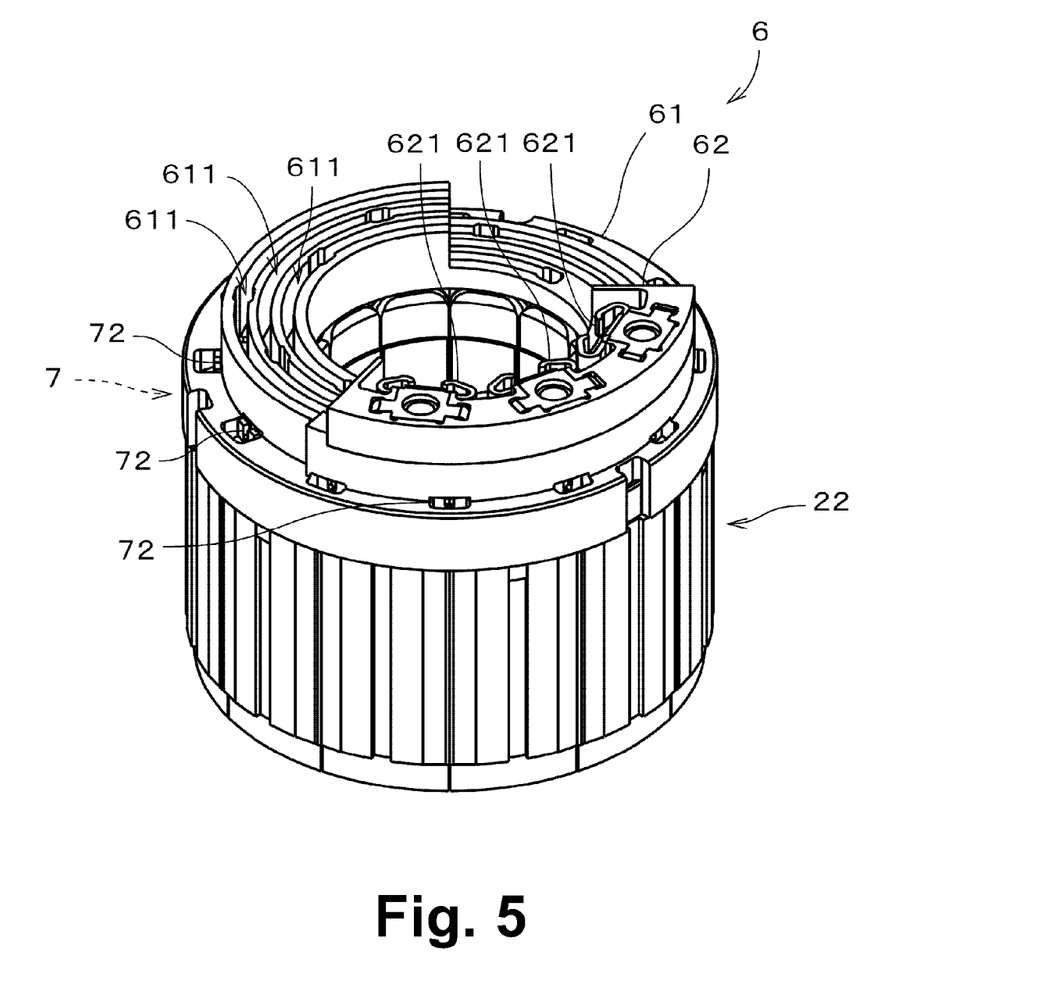
FIG. 5 is a schematic perspective view of an annular terminal block and an armature of the motor.

FIG. 5 is a schematic perspective view of the annular terminal block 6 and the armature 22 according to the present preferred embodiment. The twelve coils 223 (see FIG. 3) of the armature 22 are preferably connected via a star connection, wherein one end of each coil 223 extends above the annular terminal block 6 and the other end of the same is connected to a conductive member having a substantially annular shape which functions as a neutral point below the annular terminal block 6. In the description hereafter, a portion of each coil 223 extending above the annular terminal block 6 will be referred to as "bus wire 25" (see FIG. 9). An end portion of the bus wire 25 is referred to as "first end portion" and another end portion of the bus wire 25 which is connected to the annular conductive member is referred to as "second end portion". The annular terminal block 6 preferably includes a bus wire guiding portion 61 which extends substantially annularly along a top end portion of the armature 22, and a connection terminal portion 62 having a substantially arc shape. The connection terminal portion 62 is preferably detachably attached to the bus wire guiding portion 61 by a deformation process or via screws or other suitable fastening method, material or member, for example. The bus wire guiding portion 61 preferably includes a plurality (i.e., three in the present preferred embodiment) of groove shaped passages (hereafter, "groove portion 611") at an upper portion (i.e., away from the armature) thereof. That is, the number of the groove portions 611 is preferably equal to the number of the phases of the coils. The groove portions 611 are arranged in a radial direction. The bus wires 25 of the coils 223 are preferably guided by the bus wire guiding portion 61, lead to the connection terminal portion 62, and connected to the external power source (not shown) at the connection terminal portion 62.

Figure 6:
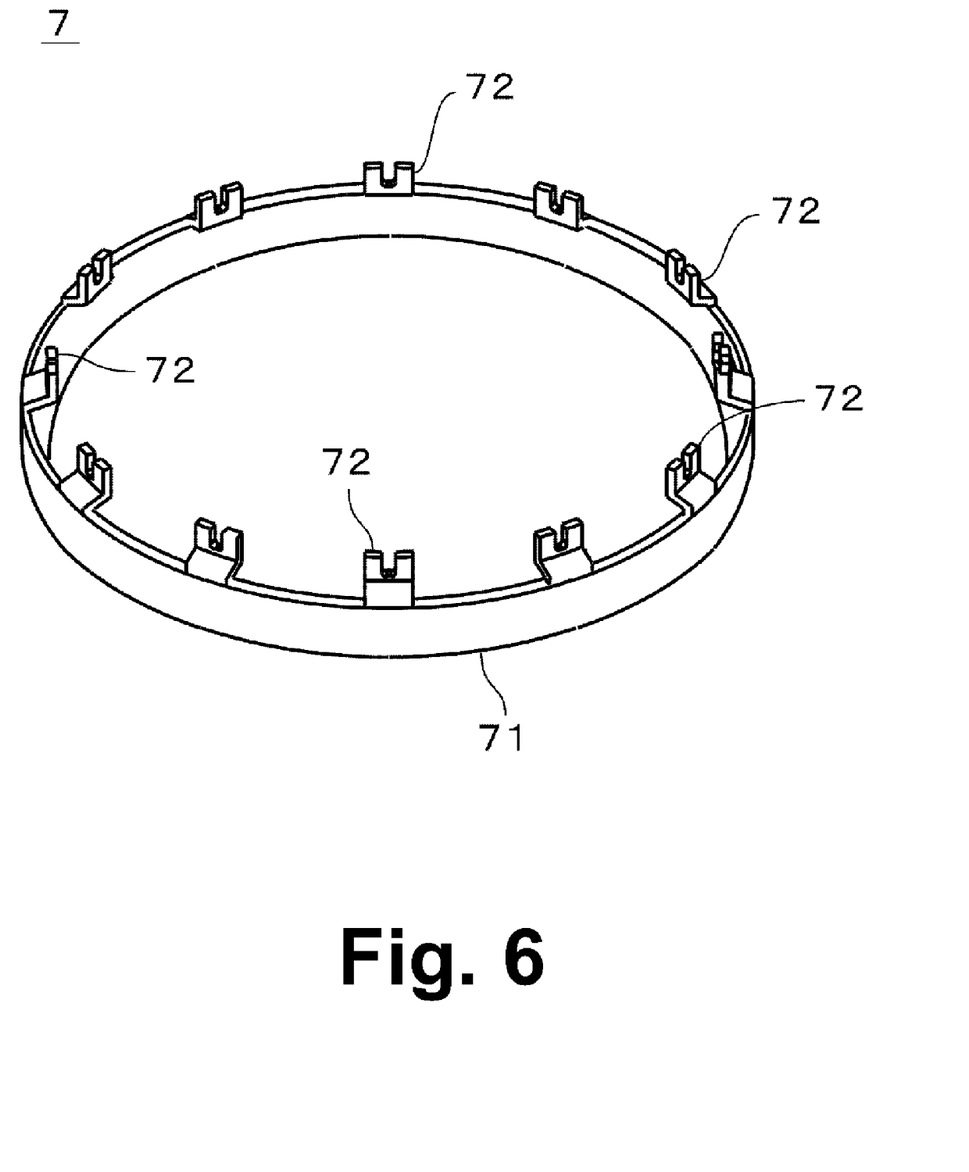
FIG. 6 is a schematic perspective view of a neutral point ring of the motor.

FIG. 6 is a schematic perspective view of a neutral point ring 7 at which the second end portions of each coil 223 (see FIG. 3) are connected. The neutral point ring 7 preferably includes a ring body 71 having a substantially annular shape, and a plurality (i.e., twelve) of terminals 72 arranged evenly apart from one another over the ring body 71. As shown in FIG. 3, the neutral point ring 7 is preferably arranged above the insulator 222 of the armature 22 (to be more specific, above the core back 2211 of the stator core 221), and below the annular terminal block 6. The terminal 72 of the neutral point ring 7 is preferably arranged at the groove portion 611 arranged radially outer side of the annular terminal block 6. The terminal 72 is preferably connected to the second end portion of each coil 223. According to the motor 1, since the neutral point is arranged in a space saving manner at the upper end of the armature 22, an axial height of the motor 1 is minimized. Also, as shown in FIG. 5, the bus wire guiding portion 61 includes hole portions corresponding to each terminal 72, and therefore, the axial height of the motor 1 is minimized.

Figure 7:
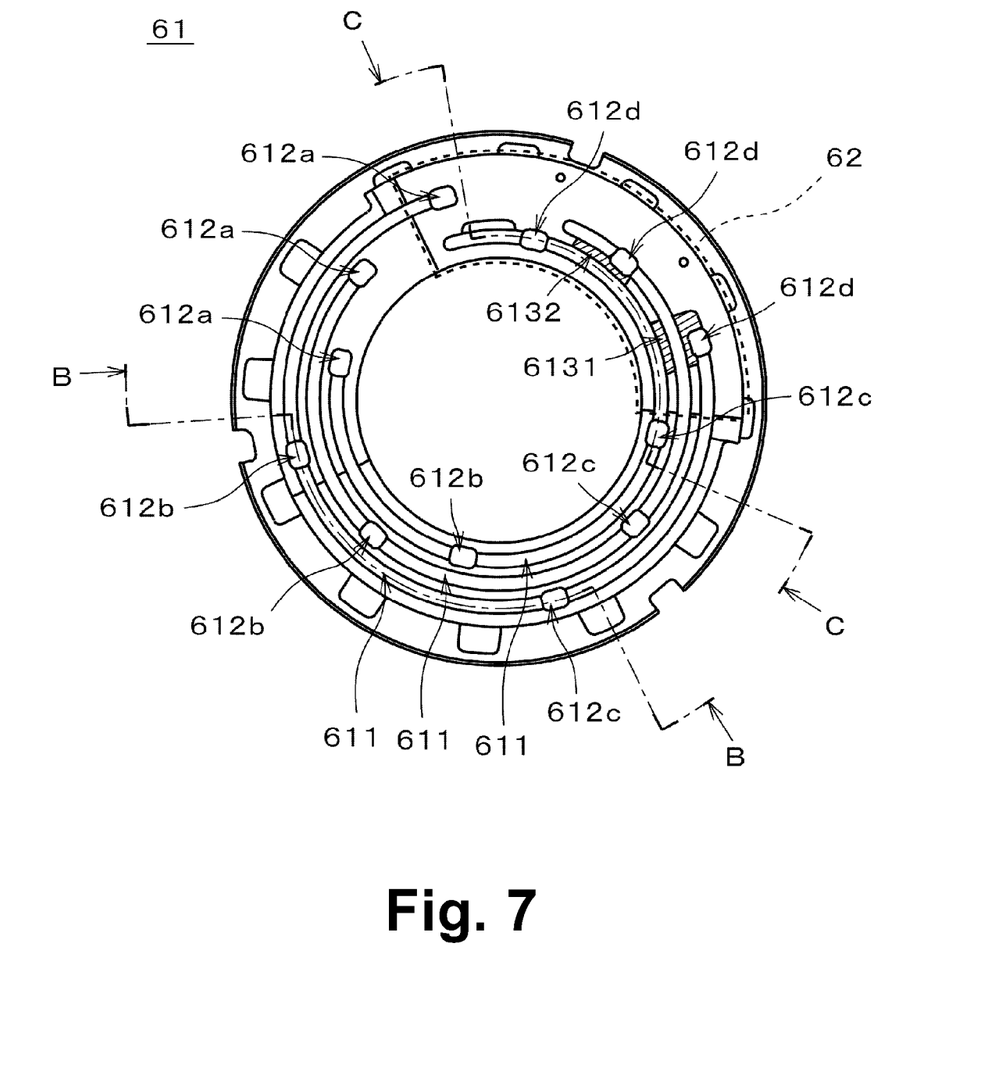
FIG. 7 is a schematic plan view of a bus wire guiding portion of the motor.

FIG. 7 is a schematic plan view of the bus wire guiding portion 61 in which an outer shape of the connection terminal portion 62 is depicted by a broken line. Each groove portion 611 of the bus wire guiding portion 61 preferably includes four hole portions (612a to 612d) arranged in a counter clock wise direction. As shown in FIG. 5, a side of the groove portions 611 includes a step. From the hole portions 612a through 612d of each groove portion 611, the bus wires 25 are guided within the corresponding groove portions 611. A diameter of each hole portion 612a through 612d is preferably greater than that of the groove portion 611. By virtue of such configuration, the bus wire 25 will be easily extended via the hole portions 612a to 612d. The bus wire guiding portion 61 guides the three bus wires 25 of a corresponding phase extending from the hole portion 612a to 612d in a substantially arc manner counter clockwise direction, and leads the bus wires 25 to the connection terminal portion 62. Note that the bus wire 25 extending from the hole portion 612d is directly connected to the connection terminal portion 62 without traveling via the groove portion 611.

Figure 8:
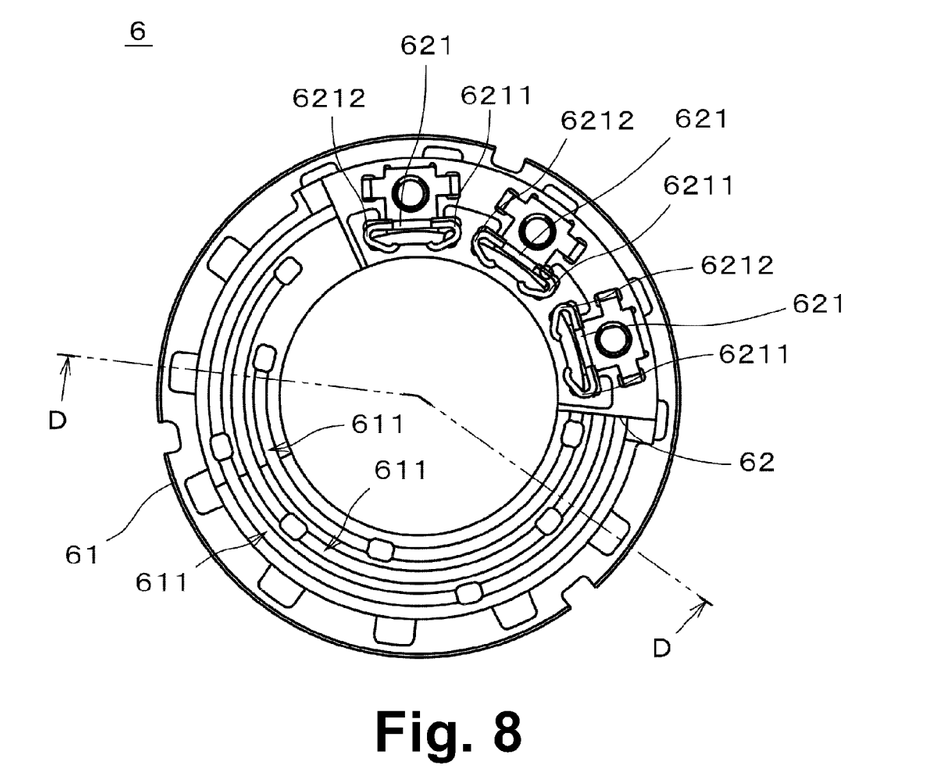
FIG. 8 is a schematic plan view of the annular terminal block of the motor.

FIG. 8 is a schematic plan view of the annular terminal block 6 at which the bus wire guiding portion 61 and the connection terminal portion 62 are assembled together. Three terminals 621 of the connection terminal portion 62 are preferably arranged in a circumferential direction above the radially innermost groove portion 611. The terminal 621 which is, according to FIG. 8, at the farthest right location, corresponds with the bus wire 25 which is guided in the groove portion 611 at the radially outside; the terminal 621 in the middle corresponds with the bus wire 25 which is guided in the groove portion 611 arranged next to the one mentioned above; and the terminal 621 which is, according to FIG. 8, at the farthest left location, corresponds with the bus wire 25 which is guided in the groove portion 611 at the radially inside.

Figure 9:
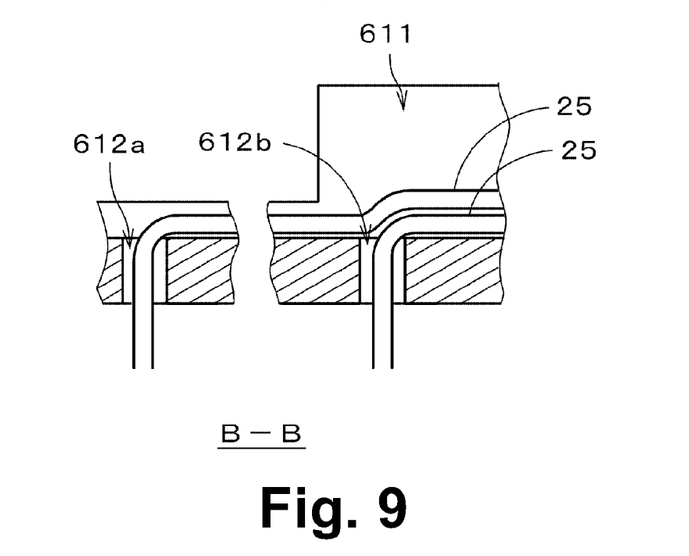
FIG. 9 is a schematic cross sectional view of a portion of a groove portion of a bus wire guiding portion of the motor.
Figure 10:
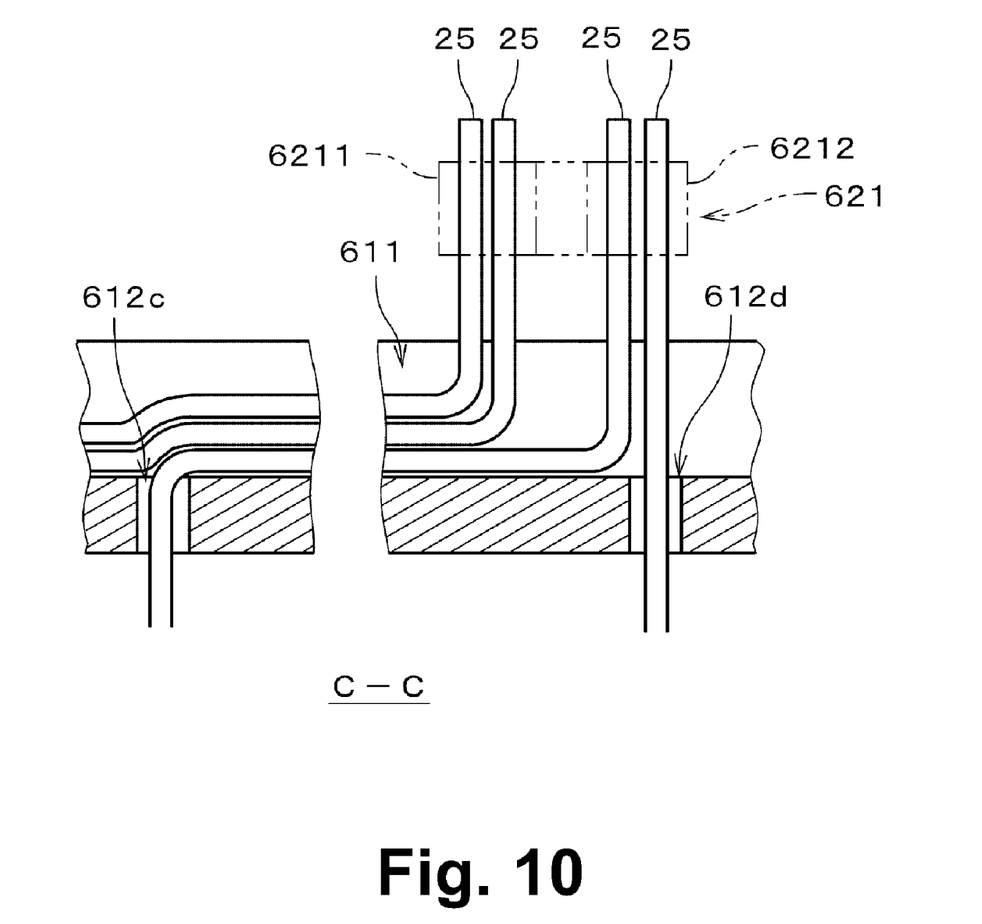
FIG. 10 is a schematic cross sectional view of another portion of the groove portion of the bus wire guiding portion of the motor.

FIG. 9 is a schematic cross sectional view of the bus wire guiding portion 61 taken along a line B-B shown in FIG. 7. FIG. 10 is a schematic cross sectional view of the bus wire guiding portion 61 taken along a line C-C shown in FIG. 7. Note that one of the terminals 621 of the connection terminal portion 62 (see FIG. 8) is depicted by an alternate long and short dashed line in FIG. 10. As shown in FIGS. 9 and 10, bus wires 25 each extending from the hole portions 612a to 612d inside the groove portion 611 are preferably laminated in the axial direction and lead to the connection terminal portion 62.

As for the number of the bus wires 25 within the groove portion 611, there is one bus wire 25 at a space between the hole portion 612a and hole portion 612b, two bus wires 25 at a space between the hole portion 612b and the hole portion 612c, and three bus wires 25 at a space between the hole portion 612c and the connection terminal portion 62 (see FIG. 7). As shown in FIG. 10, the first end portion of the bus wire 25 extending from the hole portion 612a and the first end portion of the bus wire 25 extending from the hole portion 612b are put together and connected to one end of a claw portion 6211 shown in FIGS. 8 and 10. In a similar manner, the first end portion of the bus wire 25 extending from the hole portion 612c and the first end portion of the bus wire 25 extending from the hole portion 612d are put together and connected to a claw portion 6212 of the terminal 621. Note that the first end portion of each bus wire 25 is connected to the claw portion 6211 and/or claw portion 6212 by caulking, welding or other suitable method, material or member, for example. With respect to other groove portions 611, three bus wires 25 are laminated, guided in a similar manner as described above, and connected, along with a remaining bus wire 25, to corresponding claw portions 6211 and 6212.

As described above, the groove portions 611 include steps, and, as described above, depths to correspond with the laminated bus wires 25 to accommodate therein the bus wires 25. Also, as shown in FIG. 7, the groove portions 611 other than the one arranged radially inwardly include a notch 6131 and notch 6132 (depicted by parallel diagonal lines) near the hole portion 612d notched radially inwardly. The bus wires 25 extend via the notch 6131 and notch 6132, and are connected to the terminal 621. Note that the notches 6131 and 6132 are preferably shallow with respect to the depth of the groove portion 611, and therefore, the bus wires 25 extending separate groove portions 611 make no contact with one another.

Figure 11:
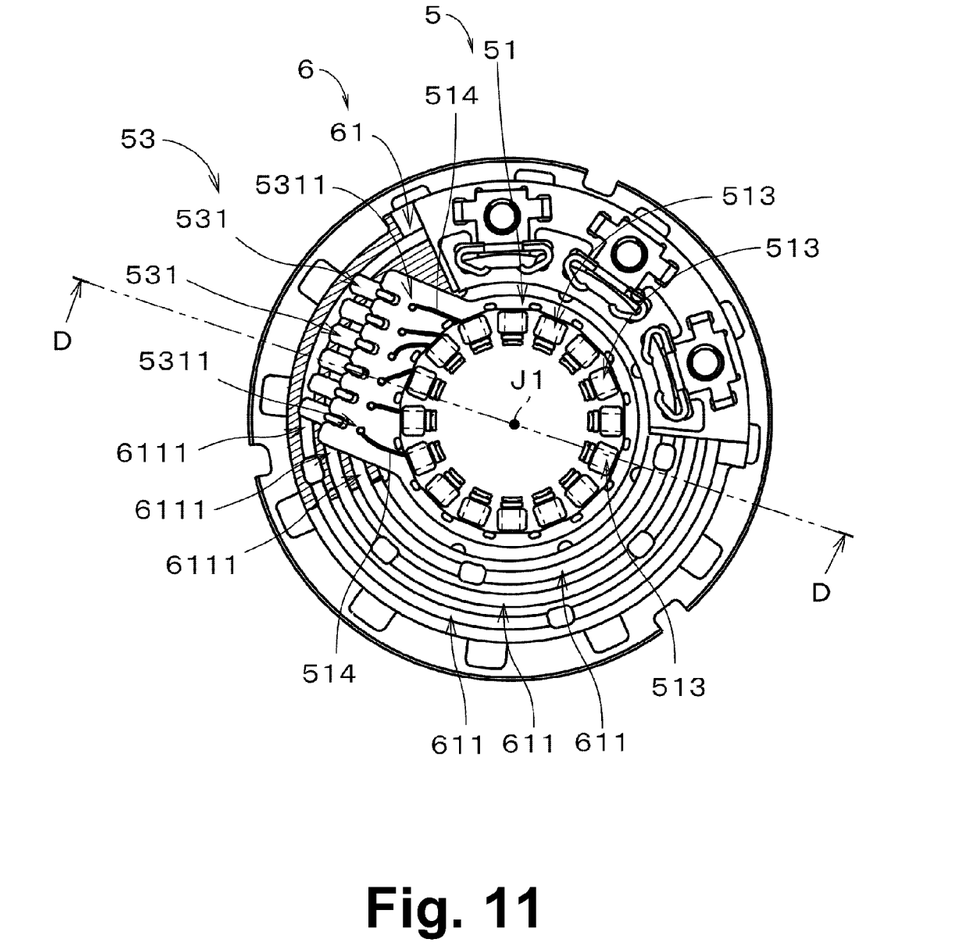
FIG. 11 is a schematic plan view of a portion of a resolver and the annular terminal block.
Figure 12:
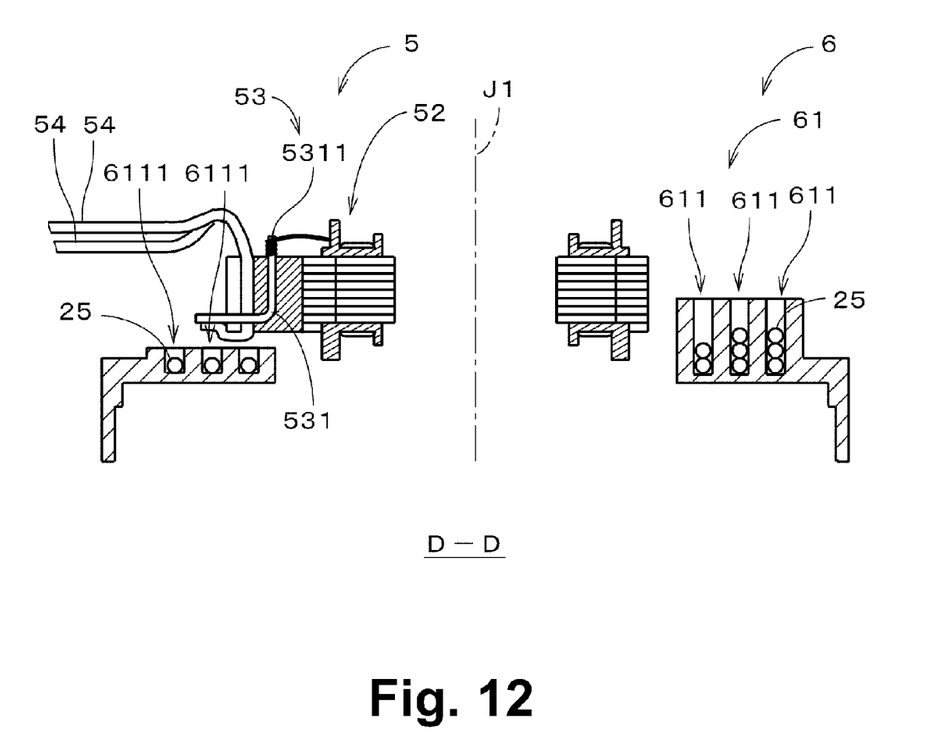
FIG. 12 is a schematic cross sectional view of the resolver and the bus wire guiding portion of the motor.

FIG. 11 is a schematic plan view of a portion of the resolver stator portion 51 and the annular terminal block 6. FIG. 12 is a schematic cross sectional view of the bus wire guiding portion 61 of the annular terminal block 6 and that of the resolver 5 taken along a line D-D shown in FIG. 11. FIG. 12 also depicts an external wiring 54 connected to the resolver 5 and a cross section of the bus wire 25 at the bus wire guiding portion 61. As shown in FIG. 12, the bus wire guiding portion 61 includes a portion 6111 (hereafter, non-layered portion 6111) per groove portion 611 each accommodating therein only one bus wire 25 (i.e., bus wires 25 are not layered on top of another) and which is arranged in the radial direction. The non-layered portion 6111 includes a smaller axial height than the rest of the groove portion 611 at which the plurality of bus wires 25 are laminated.

FIG. 11 depicts an area on both sides (of the grooves) of the non-layered portion 6111 by parallel diagonal lines. As shown in FIGS. 11 and 12, the connector portion 53 of the resolver 5 is arranged above the non-layered portion 6111. The connector portion 53 preferably includes, for example, six (see FIG. 11) resolver terminals 531 which are bent to have an "L-shape", a terminal pin 5311 which protrudes above the connector portion 53 at the resolver terminal 531. The terminal pins 5311 are connected to a wire 514 which defines the coils 513. In order words, the terminal pins 5311 are arranged at one end of the resolver terminal 531 to which the wire 514 is connected. At the other end of the resolver terminal 531, the external wiring 54 is connected thereto (see FIG. 12). By virtue of such configuration in which the resolver 5 is connected to the control unit 93 (see FIG. 1) above the non-layered portion 6111, the axial height of the motor 1 is reduced while including the resolver 5 thereon.

As described above, since three bus wires 25 of the same phase are put together and guided to a corresponding groove portion 611 of the annular terminal block 6, a space required to guide the bus wires is reduced, and thereby minimizing the motor 1. Also, since the groove portions 611 in which the bus wires 25 of each phase are accommodated include groove shaped passage, the bus wires 25 of each phase are insulated from one another. Since the number of the groove portions 611 correspond with the number of phases, the configuration for guiding the bus wires 25 is simplified thereby reducing the cost for manufacturing the motor 1. Also, since the bus wires 25 of the same phase are put together, connection error of the wires is prevented. Also, because the three bus wires 25 of the same phase are laminated in the groove portion 611, a radial width required to guide the bus wire is minimized.

The bus wires 25 extending from the hole portion 612a and 612b, and those extending from the hole portions 612c and 612d are respectively put together and correspondingly connected to the claw portion 6211 and claw portion 6212 of the terminal 621, whereby reducing the work load required for the connection between the connection terminal portion 62 and the bus wires 25. Also, since the hole portion 612d is arranged below the terminal 621 of the connection terminal portion 62, the number of the bus wires guided via the groove portion 611 is reduced. Since the bus wire guiding portion 61 and the connection terminal portion 62 are detachable from one another, the bus wires 25 are guided efficiently free of the connection terminal portion 62.

Figure 13:
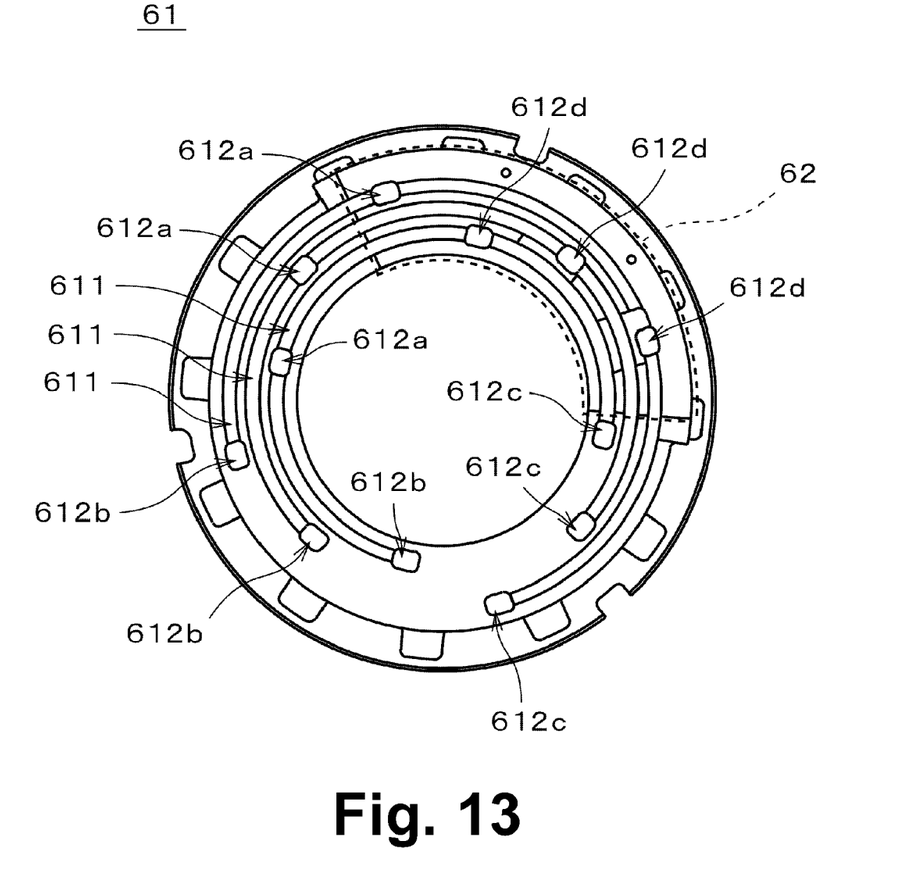
FIG. 13 is a schematic plan view of a bus wire guiding portion according to another preferred embodiment of the present invention.

While the first preferred embodiment of the present invention has been described in detail so far, the present invention is not limited to this first preferred embodiment. Various modifications may be applicable in the present invention. For example, two of the bus wires 25 extending from the hole portions 612a to 612c may be guided to an opposite direction from that the remaining one bus wire 25 is guided and connected to the connection terminal portion 62. To be more specific, as shown in FIG. 13, the bus wires 25 extending from the hole portions 612a and 612b at one of the groove portions 611 of the bus wire guiding portion 61 are guided in the clockwise direction according to FIG. 13 to the connection terminal portion 62 (outline of which is depicted by the broken line) while the bus wire 25 extending from the hole portion 612c is guided in the counter clockwise direction to the connection terminal portion 62. In such a case, the number of the bus wires 25 between the hole portion 612a and hole portion 612b is one, that between the hole portion 612b and the connection terminal portion 62 is two, and that between the hole portion 612b and the connection terminal portion 62 is one. By virtue of such configuration, the number of bus wires 25 laminated in each groove portion 611 is reduced, and thereby the axial height of the bus wire guiding portion 61 can be reduced. The hole portion 612d is arranged below the connection terminal portion 62 in the same manner as in the first preferred embodiment. Also, the bus wire 25 extending from the hole portion 612d is not guided via the groove portion 611 and is directly connected to the connection terminal portion 62.

Figure 14:
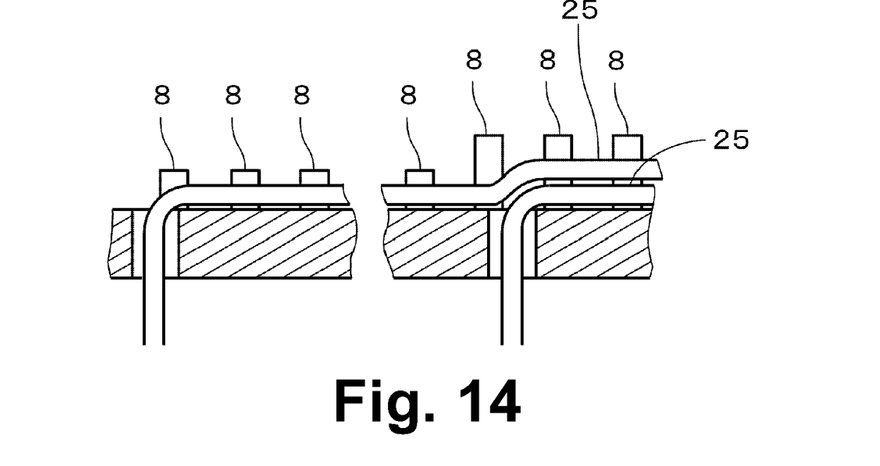
FIG. 14 is a schematic cross sectional view of a groove portion of a bus wire guiding portion according to another preferred embodiment of the present invention.

Also, as shown in FIG. 14, the bus wire guiding portion may include, instead of walls for each groove portion 611, a plurality of pins 8 which are arranged in a substantially arc shape each having an axial height in accordance with the number of the bus wires 25 laminated therein, and which guide the bus wires 25 of the same phase to the connection terminal portion.

In the preferred embodiments described above, the bus wires 25 having the same phase may be guided via a plurality of groove portions, even in which case, the bus wires 25 of the same phase are guided via the common passage and insulation between the bus wires 25 will be carried out effectively. Also, note that the bus wires 25 of all phases do not need to be guided via the groove portions. For example, the bus wires of two phases are guided via two groove portions while the bus wire of the remaining phase may be connected directly to the connection terminal portion.

Although according to the preferred embodiments described above, the bus wire 25 extending from the hole portion 612d which is arranged below the connection terminal portion 62 is put together with the bus wire 25 extending from the hole portion 612c, the bus wire 25 extending from the hole portion 612d may be put together with the bus wires 25 extending from the hole portion 612a and hole portion 612b. Also, the bus wire 25 extending from the hole portion 612d may be put together with at least two of the bus wires 25 extending from the hole portions 612a to 612c, and connected to the terminal 621. That is, at least two of the bus wires 25 guided via the groove portion 611 are put together and are connected to the terminal 621, thereby reducing the work load required for the connection between the connection terminal 62 and the bus wires 25.

According to the preferred embodiments described above, at the portion of the bus wire guiding portion 61 where the three bus wires 25 are put together to be guided, if there is enough radial width, two of the three bus wires 25 may laminated in the axial direction while the remaining bus wire 25 is arranged radially next to the two bus wires 25.

Note that the bus wire guiding portion 61 does not need to have a completely annular shape. The bus wire guiding portion 61 may be a substantially annular shape with a portion thereof being notched.

Note that in the preferred embodiments described above, one or more Hall elements may be used to substitute the resolver 5 arranged to detect the rotary position of the motor. In such a case, the one or more Hall elements are arranged above the non-layered portion 6111 in the same manner as the resolver 5. As described above, when the sensor portion is arranged such that at least a portion thereof is above the non-layered portion 6111 of the bus wire guiding portion, the axial height of the motor will be reduced.

Note that in the preferred embodiments described above, the coils arranged on at the stator core 221 may be provided in a distributed winding manner. The bus wires do not need to be extracted from each coil; two coils may be arranged at two adjacent teeth continuously wherein two bus wires are extracted from the two coils. Also note that, the guiding configuration of the bus wires according to the preferred embodiments may be applied to a multiple phase alternating current motor other than the three phase alternating current motor described above. Also, the motor 1 may also be used as a mechanical power source in a vehicle other than the power steering device 9.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A motor comprising:
    a stator portion including an armature having a substantially cylindrical shape;
    a rotor portion arranged at an inner side of the armature;
    a bearing mechanism arranged to support the rotor portion in a rotatable manner substantially coaxially about a central axis with respect to the stator portion; and
    an annular terminal block having a substantially annular shape arranged at one axial end of the armature, the annular terminal block arranged to guide a bus wire extending from the armature and to connect the bus wire to an external power source; wherein
    the annular terminal block includes:
        a bus wire guiding portion having a substantially annular shape arranged along the armature, and including a guiding configuration in which a plurality of bus wires of a common phase are guided via a common passage having a substantially arcuate shape; and
        a connection terminal portion arranged to connect the plurality of bus wires of a common phase extending from the bus wire guiding portion with the external power source.

2. The motor according to claim 1, wherein the guiding configuration includes a groove in which the plurality of bus wires of a common phase are guided.

3. The motor according to claim 1, wherein the guiding configuration includes the same number of passages as the number of phases, and the bus wires are guided in a corresponding passage having a substantially arcuate shape in accordance with the phase.

4. The motor according to claim 3, wherein the guiding configuration includes a plurality of passages arranged in a radial direction.

5. The motor according to claim 4, wherein
    a plurality of coils are connected via a star connection at the armature; and
    a substantially annularly shaped conductive member which defines a neutral point is arranged radially outward of the plurality of passages and on top of a core back connecting a plurality of teeth of the armature.

6. The motor according to claim 4, wherein the bus wires of a common phase are guided in a groove arranged at an opposite side with respect to the armature of the bus wire guiding portion.

7. The motor according to claim 6, wherein the bus wires of a common phase are laminated in the groove in a direction substantially parallel with the central axis.

8. The motor according to claim 7, wherein
    the motor further includes a sensor portion arranged to detect a rotary position of the rotor portion;
    the bus wire guiding portion includes a non-layered portion at which only one bus wire is guided; and
    at least a portion of the sensor portion is arranged above the non-layered portion.

9. The motor according to claim 6, wherein the groove includes a hole via which the bus wire is guided from the armature, and a diameter of the hole is greater than a width of the groove.

10. The motor according to claim 1, wherein at least two of the plurality of bus wires of a common phase are placed together and connected to a terminal of the connection terminal portion.

11. The motor according to claim 10, wherein a bus wire of the plurality of bus wires of a common phase extends from below the connection terminal portion and is placed together with any one of the plurality of bus wires of a common phase to be connected to one of the terminals.

12. The motor according to claim 10, wherein the bus wire guiding portion and the connection terminal portion are detachably connected to one another.

13. The motor according to claim 1, wherein the motor is arranged to assist an operator of a vehicle.

* * * * *